United States Patent
Unger et al.

[15] 3,682,089
[45] Aug. 8, 1972

[54] ELECTRIC COFFEE PERCOLATOR

[72] Inventors: John J. Unger, Elmhurst; Robert J. Augustine, Downers Grove; Farees U. Khaja, Chicago, all of Ill.

[73] Assignee: Sunbeam Corporation, Chicago, Ill.

[22] Filed: June 30, 1970

[21] Appl. No.: 51,193

[52] U.S. Cl. .................99/281, 99/310, 219/436
[51] Int. Cl. ...........................................A47j 31/00
[58] Field of Search........99/280, 281, 282, 283, 307, 99/308, 309, 310, 311, 312, 313, 314, 315; 219/436, 437

[56] References Cited
UNITED STATES PATENTS

| | | |
|---|---|---|
| 2,763,767 | 9/1956 | Lohrman.....................99/281 |
| 2,817,743 | 12/1957 | Foster..........................99/310 |
| 3,333,087 | 7/1967 | Manship......................99/281 |
| 3,429,252 | 2/1969 | Colonna......................99/281 |

*Primary Examiner*—Robert W. Jenkins
*Attorney*—George R. Clark

[57] ABSTRACT

An electric coffee percolator having a glass vessel with an opening in the bottom through which a metallic well for a pump assembly extends. Associated with the well are electric heating elements for both operating the percolator pump and keeping the contents of the vessel warm after coffee making has been completed. The seal between the metallic heater and well portion and the glass vessel is accomplished by an annular gasket which is of substantial vertical height and includes an undercut at the lower edge thereof to receive and lock the glass vessel portion in sealed engagement with the metallic well portion. All of the functional parts enclosed in the base of the percolator including the thermostat, the main heating element, and the keep warm heater are supported in a unitary assembly which rests upon a plastic base from which the handle is also supported. The upper portion of the handle includes a simple latch which detachably engages the upper edge of the glass vessel, the latch actuating portion being easily accessible to the hand of the user and in its released position being substantially exposed so as to warn the user that the latch is not engaged with the glass vessel.

12 Claims, 9 Drawing Figures

Inventors:
John J. Unger
Robert J. Augustine
Farees U. Khaja
By: Neil M. Rose
Atty.

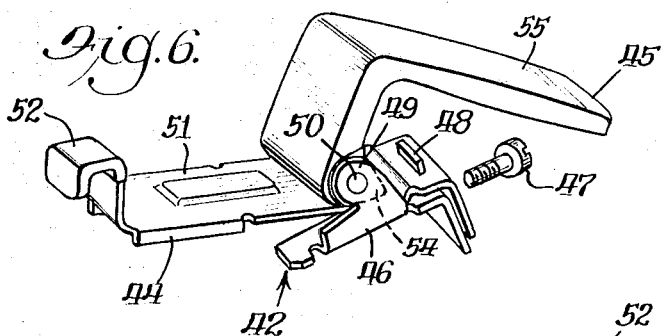
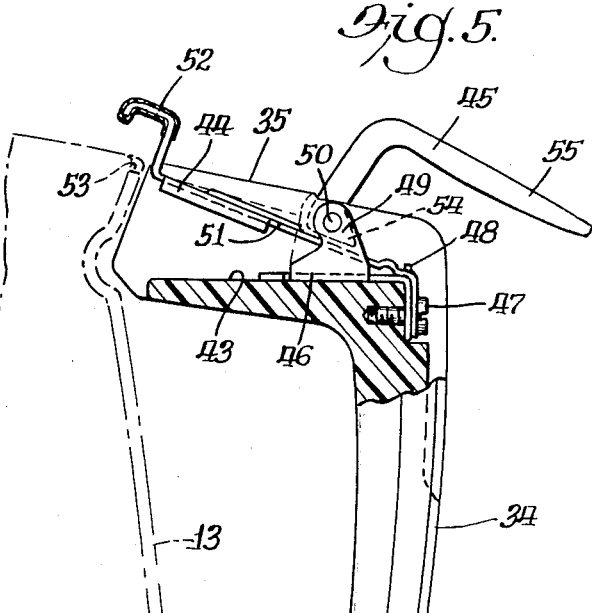
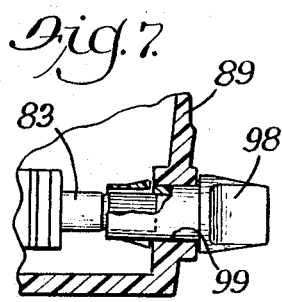
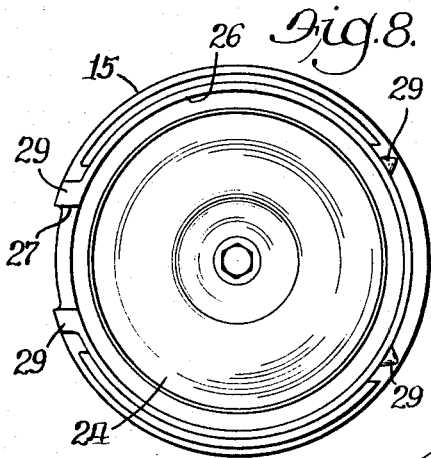
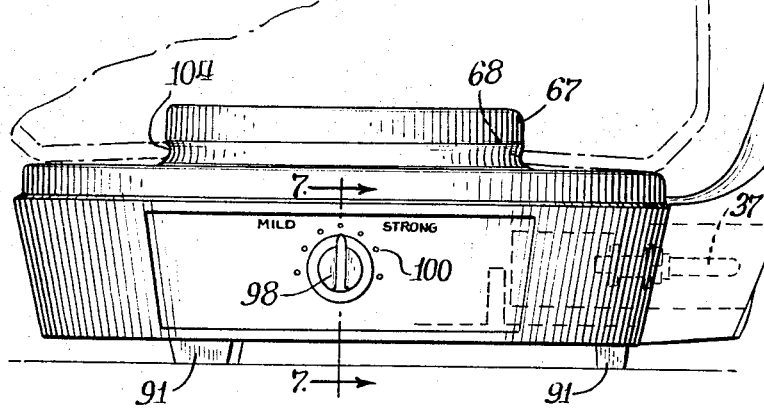

ELECTRIC COFFEE PERCOLATOR

BACKGROUND OF THE INVENTION

During the past twenty years there has been a tremendous increase in the popularity of the percolator type coffeemaker which is now conventionally made of either a stainless steel, aluminum or chromium plated brass. Prior to this increase in popularity of the percolator, glass vessel vacuum type and drip type coffeemakers were predominant in the home coffee making area. The glass vessel coffeemaker had the definite appeal because of the cleanliness associated with the glass vessels and the feeling on the part of the public that the glass vessels would have no effect on the taste of the coffee.

In making an electric percolator, however, it is necessary to provide a heating element associated with a pump well which will provide the percolating or pumping action. The easiest means of mounting an electric heater in good heat transfer relation to the pump was through the use of a metallic vessel having a heating element brazed or otherwise secured to the bottom thereof. While this provided an inexpensive approach to an electric percolator, the consumer has been less than happy with the thought of using a metallic vessel in connection with the brewing of coffee. This feeling persists even though stainless steel and chromium plated metal vessels produce no measurable taste difference in coffee made in vessels of these metals.

There are examples in the prior art of glass vessel percolators having a metaliic well for the pump well which extends through an opening in the bottom of the glass vessel so as to operate the pump contained within the vessel. The U.S. Pat. to Rodrick et al No. 3,093,061 is one example of such an electric percolator. One of the problems associated with the Rodrick et al patent is that the glass vessel portion and the base enclosing the heater and thermostatic controls were not easily separable to permit washing of the vessel. The U.S. Pat. to Olds No. 2,003,490 disclosed that a percolator in which means were provided to detachably connect the glass vessel to the base and percolator pump so that the vessel could be removed for cleaning purposes. Although the prior art disclosed the broad idea of having an electric percolator with a glass vessel which is detachable from the metallic well and base portion thereof, there are many problems associated with a coffeemaker construction of this type which have not been adequately solved heretofore. Since the effect of metallic vessels on the taste of coffee is very questionable and considering the fact that the consumer's preference for glass vessels may be largely emotional, it is important that an electric glass percolator function as well as a corresponding metallic vessel percolator and also that it sell in approximately the same price range. If these price and functional objectives cannot be achieved, the market for the glass percolator is very limited.

One of the principal problems associated with the glass vessel percolator having a metallic well for the pump is that of providing a satisfactory seal between the glass vessel and the metallic pump which seal may be readily broken or separated when the glass vessel is detached from the base portion of the coffeemaker. In addition, it is desirable to provide a latch of some type to hold the glass vessel portion in assembled relation to the base portion which includes the metallic well. Recognizing the dangers involved in having the vessel detached from the base or become unsealed from the well when the vessel is filled with hot coffee, it is important that the latch be one that is positive in its action and one which the user may readily determine whether or not it is properly engaged.

In most electric percolators it is fairly difficult to arrange the main heating element which causes the percolating or pumping action and the keep warm heater in such a way that there is no repercolating of the coffee when the coffeemaker is left energized for substantial periods of time after the coffee making has been completed. Because of the limitations imposed by the combined glass vessel and metallic well construction, this problem of arranging the keep warm heater and the main heater to properly accomplish their functions is magnified considerably. While the problem of sealing between the glass vessel and the metallic pump well is increased with any increase in diameter of the metallic well portion, it is important that both the keep warm and the main heating element or pump heater be positioned to perform their respective functions properly.

SUMMARY OF THE INVENTION

The invention relates to an electric percolator having a glass vessel which is sealed to a metallic pump well and heater by means of an annular vertically extending gasket which is recessed so that the glass vessel slides into an undercut area providing a positive seal and lock between the glass vessel and the metallic well. The base portion of the combined glass vessel and metal well percolator is made up of a simple plate assembly which supports the percolator pump well, the keep warm heater and the main heating element as well as the thermostat. This assembly is mounted on a relatively shallow plastic base member to provide a base portion which occupies a minimum space in the vertical direction and which supports the glass vessel.

In order to latch the glass vessel to the metallic well and base portion of the coffeemaker, the upwardly extending handle carried by the base includes a simple latch which applies pressure downwardly on the glass vessel by means of an L-shaped lever which lies in a recess in the handle in the engaged position of the latch and extends outwardly for convenient thumb operation when the latch is in its disengaged position. The latch itself consists of a simple one piece member which is secured to the handle and is self-biased to a disengaged position. The operating lever simply pivots the latch member into engagement with the vessel with the resilience of the lever providing the biasing force against the glass vessel.

Accordingly, it is an object of the present invention to provide an improved electric percolator having a glass vessel and a metallic well which is detachably sealed to the bottom of the glass vessel.

It is a further object of the present invention to provide an improved electric percolator having a metallic well enclosing an electrical heater with a gasket surrounding the well to provide an improved seal between the glass vessel and the well.

It is another object of the present invention to provide an electric percolator having a glass vessel portion which is detachably secured to the base portion by means of an improved handle latch.

It is another object of the present invention to provide an improved electric percolator having a detachable glass vessel which is secured to the base portion by means of an L-shaped latch which is contoured to fit within a handle recess when in the closed position and is readily rotated to a released position in which it protrudes outwardly from the handle.

A further object of the present invention is to provide an improved electric percolator having a glass vessel and a base portion having a flat plate assembly enclosing and supporting the main heating element, the keep warm heater and the thermostat.

Further objects and advantages will become apparent as the following description proceeds and the features of novelty which characterize the invention will be pointed out in the claims annexed to and forming a part of the specification.

BRIEF DESCRIPTION OF THE DRAWINGS

For a better understanding of the present invention, reference may be had to the accompanying drawings in which:

FIG. 5 is a side elevational view similar to FIG. 4 but with the glass vessel removed and shown in dotted lines only and the handle latch shown in the released position;

FIG. 6 is a perspective view of the latch mechanism shown removed from the handle;

FIG. 7 is a sectional view taken on line 7—7 of FIG. 5;

FIG. 8 is a bottom plan view of the coffee maker cover; and

SUMMARY OF THE INVENTION

Figure 1:
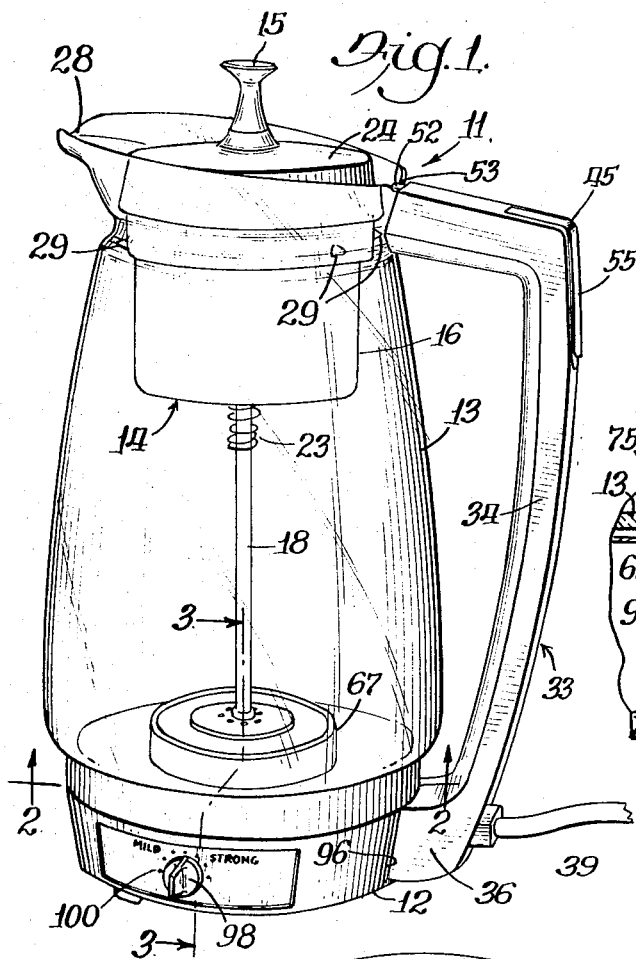
FIG. 1 is a perspective view of an electric percolator embodying our invention.

Referring now to the drawings, there is shown in FIG. 1 a perspective view of the percolator which is designated generally by reference numeral 11. The percolator 11 includes a base assembly 12, a glass vessel 13, a pump and basket assembly 14, and a cover 15. The pump assembly is of a conventional design including a basket 16 which is designed to receive ground coffee and includes perforations 17 in the bottom thereof through which the brewed coffee flows. Water flows upwardly through a tube 18 into the basket 16 where the brewing occurs. At the lower end of the tube 18 is a pump 19 which includes a one-way check valve 20 designed to permit water to enter into the area within the pump 19.

Included as part of the pump 19 is a pump well 22 which is of generally hemispherical configuration and which is heated by means to be described in greater detail below. In the normal brewing of coffee, the water contained within the vessel 13 flows into the well 22 through the check valve 20 where it is heated. When an increment of water within well 22 begins to boil, it passes upwardly through the tube 18 into the basket 16 where the brewing takes place. The cover 15 engages the top of the basket 16 and a helical spring 23 positioned immediately below the basket 16 biases the tube 18 downwardly into seated engagement with the well 22.

Figure 4:
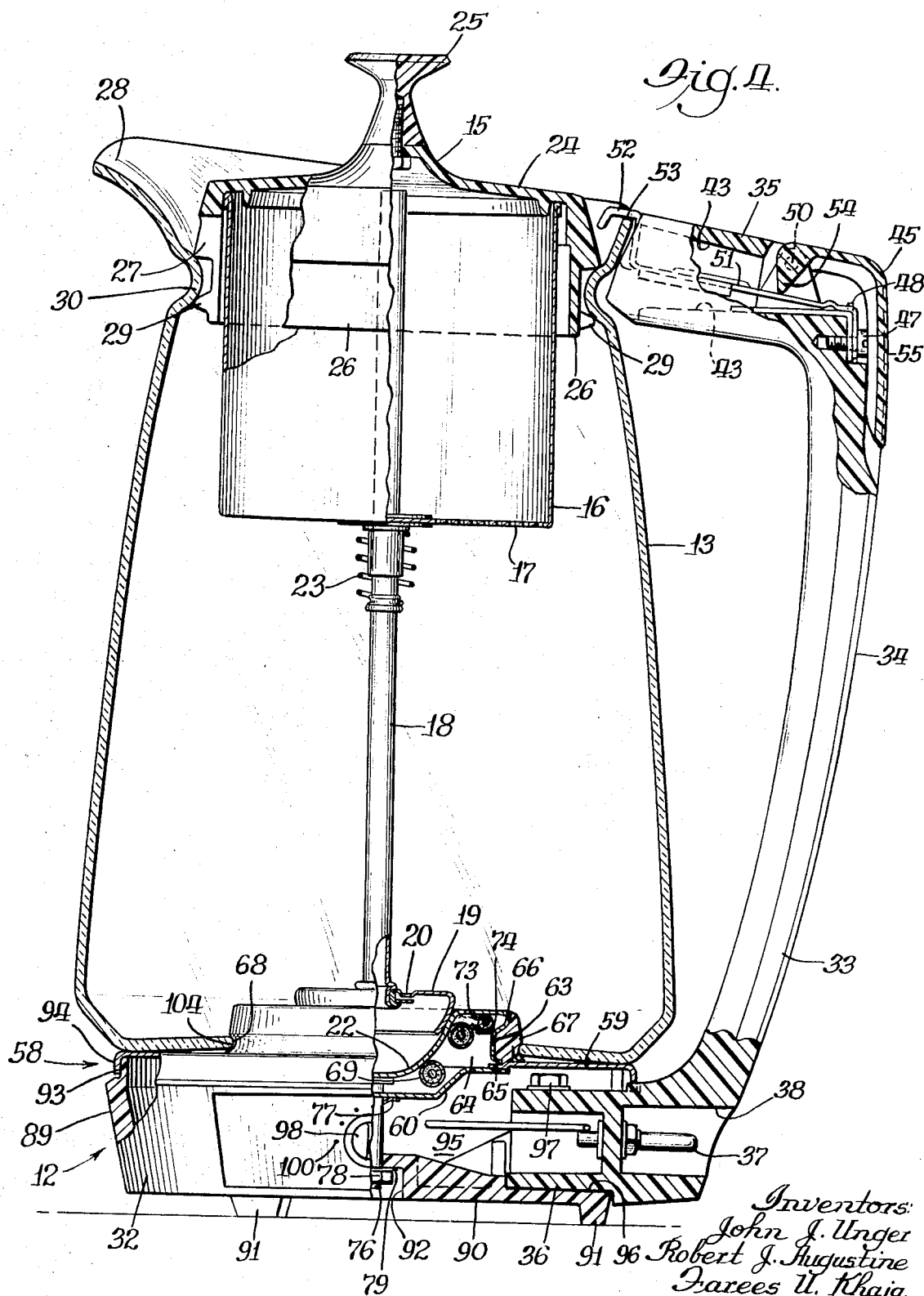
FIG. 4 is an enlarged elevational view of the percolator of FIG. 1 with portions cut away for illustrative purposes and with the glass vessel shown completely in section.

The cover 15 comprises an inverted cup-shaped member having a more or less flat top wall 24 to which a knob 25 is attached. Extending downwardly from the outer periphery of the top wall 24 is a side wall 26 which is continuous around the entire periphery of the cover 15 except for a pouring slot 27 which is best shown in FIGS. 4 and 8. The pouring slot 27 is about an inch wide and is adapted to be positioned adjacent a pouring spout 28 which is formed in the top of the side wall of the glass vessel 13. This slot 27 permits coffee to be poured from the vessel 13 while the pump and basket assembly 14 and the cover 15 are retained in the vessel 13. The cover 15 is also provided with protruberances 29 which engage under an annular shoulder 30 formed in the glass vessel 13 and extending around the mouth of the vessel 13. The protuberances 29 extend out sufficiently far that there is a slight interference between protruberances 29 and shoulder 30 as the cover 15 is inserted downwardly into the mouth of the vessel 13.

The pouring slot 27 extending through the side walls 26 has a secondary function in providing a clearance so that the side walls may flex inwardly thereby permitting the protuberances 29 to move downwardly below the shoulder 30 to lock the cover 15 in position. The protuberances thus provide a detent type of action whereby the cover 15 is locked in assembled relation to the vessel 13 but may also be removed easily by merely grasping the knob 25 and lifting upwardly until the protuberances 29 slide over the shoulder 30 in the vessel 13.

The base assembly 12 includes a base portion 32 from the side of which a handle 33 extends upwardly. Handle 33 is a somewhat U-shaped member having an elongated gripping portion 34 forming the bight thereof and at the upper end having a latching portion 35. The bottom of handle 33 forms a supporting portion 36 on which the terminal pins 37 are mounted within a recess 38. Terminals pins 37 are positioned in parallel spaced relation to permit connection to a standard electric power cord 39.

In order to retain the vessel 13 in assembled relation to the base assembly 12, there is provided a latch assembly 42 which is shown in perspective in FIG. 6. The upper end or latching portion 35 of the handle 33 is provided with a recess 43 within which the latch assembly 42 is received. The recess 43 extends along and through the top horizontal portion of the handle and down the vertically extending portion as is best shown in FIG. 5. The latch assembly 42 consists of a resilient latch member 44, an L-shaped lever 45, and a trunnion bracket 46. The trunnion bracket 46 and the latch member 44 are formed with overlapping downwardly extending mounting portions which are secured to the handle by means of an assembly screw 47. A tab 48 which extends from the trunnion bracket 46 through the latch member 44 assures proper alignment between the bracket 46 and member 44. In addition, the opening or slot in member 44 through which tab 48 extends provides a reduced section so that latch member 44 may more readily flex or pivot at that point. The bracket 46 is formed with upwardly extending trunnions 49 each of which has an aperture into which a mounting boss 50 molded integrally with the lever 45 extends. The trunnions 49 are simply spread apart slightly and the lever 45 is assembled thereto by snapping the projection 50 into engagement with the trunnions 49.

The latch member 44 has an elongated central portion 51 at the outer end of which extends a hook 52 which is adapted to be biased downwardly into engagement with a slight step or depression 53 in the upper edge of the vessel 13. The hook 52 on the latch member 44 is provided with a suitable resilient plastic coating in order to prevent chipping or damage to the upper edge of the glass vessel 13.

The lever 45 is generally L-shaped and adapted to pivot about the integrally formed bosses 50 which engage the trunnions 49. Extending outwardly from the lever 45 adjacent to the bosses 50 is a cam projection 54 which is best shown in FIG. 4. Cam portion 54 of the lever 45 is adapted to engage the central portion 51 of the latch member 44 to bias it downwardly into latching engagement with the upper edge of the vessel 13 as is shown in FIG. 4. The latch member 44 is formed so that its natural resilience urges it to a raised or disengaged position as shown in FIG. 5. The latch member 44 may only assume this position, however, when a downwardly extending manual actuating portion 55 of lever 45 is pivoted upwardly to an almost horizontal position. The resilience of the latch member 44 actually causes the lever 45 to be held in this raised position. When lever 45 is pivoted by pushing inwardly and downwardly on the manually actuating portion 55, the lever 45 is rotated clockwise as shown in FIGS. 4 and 5 until it moves to a position in which it is entirely received within the recess 43.

In that the force applied by the member 44 upwardly against the cam portion 54 is to the left of the center of the pivot at boss 50, the latch member lever 45 is maintained in the latched position shown in FIG. 4 even after finger pressure is removed from the actuating portion 55. In this position the cam portion 54 is engaged with the central portion 51 of the latch member 44 and the hook 52 is engaged with the upper edge of the vessel 13 in the depression 53. The cam portion 54 engagement causes the central portion 51 of member 44 to be flexed so as to apply a downwardly biasing force. The latch assembly 42 is obviously very simple in design including only the three molded and stamped parts, the latch member 44, the lever 45, and the trunnion bracket 46. It is only necessary to slide one's finger under the lower edge of the manual actuating portion 55 and lift the lever 45 upwardly to disengage the latch. When the latch member 44 is in the disengaged position shown in FIG. 5, the hook 52 is spaced well above the vessel 13 permitting easy removal of the vessel 13. In addition, the manual actuating portion 55 extends outwardly in a very prominent position so as to announce to the user that the latch is disengaged from the vessel 13. This serves to prevent accidental use of the percolator in instances when the vessel 13 has not been completely assembled and latched to the base assembly.

In connection with the mounting of the pump well 22 and its associated heaters and control mechanism with respect to the base portion 32, there is provided a heater assembly 58 which includes the pump well 22, an annular plate support 59 and a heater retainer 60. The pump well 22 has a hemispherical central portion 61 within which the water is heated, and extending outwardly from the upper edge of the hemispherical well portion 61 is an annular wall 62 and a downwardly depending wall 63 which defines a somewhat annular heater chamber 64. The side wall 63 is formed with a lower lip or flange 65 and an upper shoulder 66 which together form a channel on the outer surface of the pump well 22 which receives a sealing gasket 67. The outer surface of the gasket 67 engages the inner edge of a hole 68 formed in the bottom wall of the vessel 13. A suitable sealant or gasket may be used between the flange 65 and the annular plate 59 to prevent any leakage into the chamber 64 even though the gasket 67 tends to prevent any such leakage.

In order to heat the hemispherical well portion 61 of the pump well 22, there is provided a sheathed heating element 69 which is brazed to the outer surface of the portion 61 so that the element 69 is in good heat transfer relationship with the liquid contained in the well portion 61. The element 69 is of conventional construction including an outer metallic tubular sheath 70 within which is positioned a helical resistance wire 71 mounted in spaced relation to the sheath by means of compacted insulating powder such as magnesium oxide. The element 69 includes terminals 72 which are connected to the resistance wire 71 and extend outwardly from the ends of the sheath 70. As is evident from FIG. 2, the element 69 is disposed in two somewhat helically arranged loops with the ends of the sheath 70 extending downwardly and perpendicular to the bottom of the vessel 13.

Also positioned within the heater chamber 64 is an auxiliary or keep warm heater 73 which is of low wattage being about 65 watts as compared to 600 watts for the main heating element 69. The heater 73 is a flexible, rope heater which is a well known and commercially available type of heater. A single loop of the rope heater 73 is received against the annular wall 62 of the pump well 22 and is retained therein by means of a C-shaped ring 74 which is dimensioned to interfere with the interior of side wall 63 and requires slight compression of its diameter for it to be inserted upwardly into the area of enlarged shoulder 66 where it retains the keep warm element 73 at the top of chamber 64. The heater retainer 60 is provided with three upwardly extending integrally formed legs 75 which project into engagement with the ring 74. Thus, the loose coil of the element 73 is retained up against the annular wall 62 within the heating element chamber 64 by means of the ring 74 and the upwardly extending legs 75 formed on the retainer 60.

Figure 3:
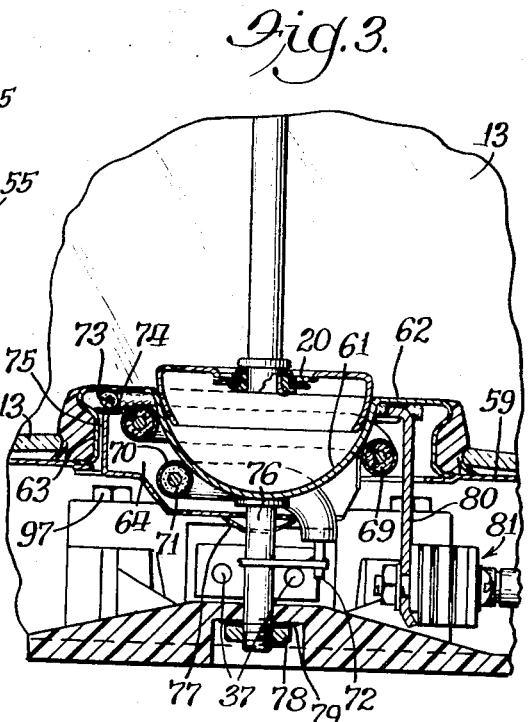
FIG. 3 is an enlarged fragmentary sectional view taken on line 3—3 of FIG. 1.

For the purpose of holding the various parts of the heater assembly 58 in assembled relationship, there is provided a downwardly extending stud 76 which is welded and brazed to the bottom of the well portion 61 and which receives a push nut 77 positioned in retaining engagement with the bottom face of the heater retainer 60. With the push nut 77 assembled to the stud 76, the annular plate 59 is sandwiched between the heater retainer 60 and the pump well 22 providing an easily handled assembly which may be then assembled to the base portion 32 by means of a nut 78 which is threadedly received on the lower end of the stud 76 as shown in FIGS. 3 and 4. A spring washer 79 is positioned between the nut 78 and the base portion 32 to maintain a compressive force on the assembled parts and to avoid over stressing the parts upon assembly.

Figure 2:
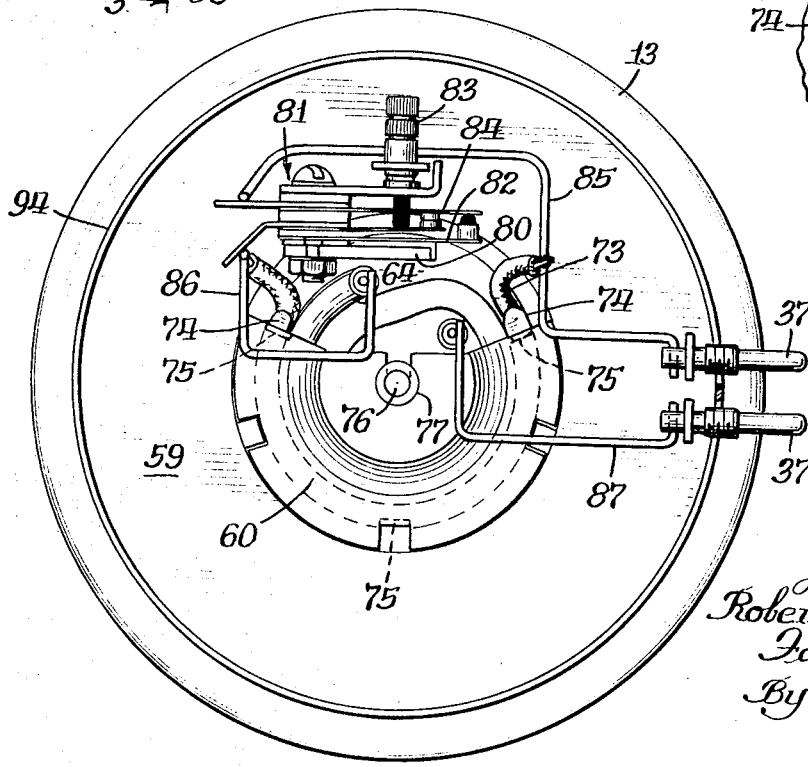
FIG. 2 is an enlarged sectional view taken substantially on line 2—2 of FIG. 1.

As is evident from FIG. 2, the heater retainer 60 is cut away so as to expose and provide access to a substantial portion of the heater chamber 64. The ends or terminals for the main heating element 69 as well as for the keep warm element 73 extend outwardly from the chamber 64 through this opening. Also extending downwardly through this opening is a thermostat mounting bracket 80 which is brazed at its upper end to the annular wall 62 of the pump well 22 as is shown in FIG. 3. The lower end of the bracket 80 supports a thermostat assembly 81 which includes a bimetal 82 responsive to the heat conducted through the thermostat bracket 80. The thermostat assembly 81 also includes a rotatable control shaft 83 which serves to adjust the temperature at which the bimetal 82 will open a pair of switch contacts 84. One of the switch contacts 84 is connected by means of a rigid conductor 85 to one of the terminal pins 37 while the other switch contact 84 is connected by a rigid conductor 86 to one of the terminals 72 of the heating element 69. The other terminal 72 of the element 69 is connected by rigid conductor 87 to the other terminal pin 37 as shown in FIG. 2. The rigid, noninsulated conductors 85, 86, and 87 are used to avoid the necessity of high temperature insulation on the wires and the necessity to provide means for positioning the wires out of contact with any high temperature metallic portions within the base portion 32.

The keep warm heater 73 is connected across the switch contacts 84 or in parallel with the switch contacts 84 as shown in FIG. 2. The operation of the circuit may be described as follows: Upon energization of the coffeemaker, the heating element 69 is energized since the switch contacts 84 are normally closed at room temperature, the keep warm element 73 being essentially inoperative since it is shorted out by the thermostat 81. After the brewing of the coffee has been completed, the contents of the vessel 13 reaches the preselected temperature at which time the thermostat 81 opens by virtue of the heat conduction through the annular wall 62 and the bracket 80 to the bimetal 82. With the opening of the thermostat 80 and its switch contacts 84, the circuit across the terminal pins 37 includes the keep warm element 73 and the main element 69 connected in series. The series connection of the keep warm element 73 lessens the current through the main element 69 so that the total heating effect is too small to cause any reperking in the pump 19, and the liquid in the vessel 13 is merely maintained at a warm temperature. The normal conduction through the bracket 80 and the radiation from the elements 69 and 73 is sufficient to maintain the switch contacts 84 open until cold water is again placed within the vessel 13 or the circuit is deenergized and the thermostat cools down to room temperature.

As was stated above, the base assembly 12 includes the plastic base portion 32 and the heater assembly 58 also described above. The plastic base portion 32 is a shallow cup-shaped, molded plastic part having peripheral side walls 89 and a bottom wall 90. The bottom wall 90 is formed with integrally molded feet 91 which support the coffeemaker 11 in spaced relation to a supporting surface. The bottom wall 90 is also formed with a recess 92 into which the assembly stud 76 extends and within which the nut 78 and spring washer 79 are positioned.

Figure 9:
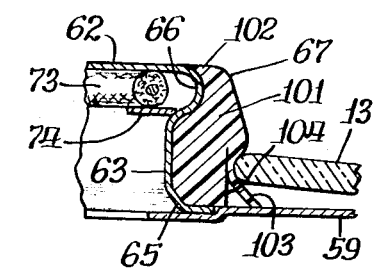
FIG. 9 is an enlarged sectional view of the gasket seal between the metallic well and the glass vessel.

The upper edge of the side wall 89 of base portion 32 is formed with a narrow shoulder 93 over which a downwardly turned flange 94 on the edge of plate 59 extends. When the assembly nut 78 is tightened into engagement with spring washer 79 and the bottom wall of the base portion 32, the heater assembly 58 is drawn downwardly against the base portion 32 with the downwardly turned flange 94 overlapping the shoulder 93 and with the upper edge of shoulder 94 engaging the flat portion of annular plate 59 as shown in FIG. 9. The heater assembly 58 and the base portion 32 together form a chamber 95 within which the thermostat assembly 81 and the lead connections or conductors 85, 86, and 87 are concealed. As is evident from FIG. 4, the base portion 32 is very shallow thereby contributing little to the overall depth or height of the coffeemaker 11 and thus permitting a maximum capacity vessel 13 while still maintaining the overall height within conventionally accepted limits.

The side wall 89 of the base portion 32 is provided with a slot or opening 96 through which the support portion 36 of the handle 33 extends. Suitable assembly bolts 97 secure the plastic handle 33 in assembled relation to the base portion 32.

For the purpose of adjusting the thermostat assembly 81, a control knob 98 is mounted on the side wall 98 of base portion 32 with a shank portion of the control knob extending through an opening 99 into engagement with the outer end of the control shaft 83. Suitable indicia 100 are provided on the outer wall 89 to be used in conjunction with the knob in setting the thermostat assembly 81. The strength of the coffee brewed in the coffeemaker 11 may be controlled by increasing the temperature level at which the thermostat assembly 81 opens the switch contacts 84 for the heating element 69.

The pump well 22 has been made of fairly substantial diameter in order that the heating element 69 might be constructed and mounted in good heat transfer relationship with well portion 61 and so that the thermostat bracket 80 as well as the keep warm element 73 could also be mounted against the annular wall 62 in good heat transfer relation to the liquid within the vessel 13. With the thermostat assembly 81 mounted on the bracket 80 which is secured to the wall 62 at a point spaced somewhat from the well portion 61, the thermostat will respond more accurately to the temperature of the liquid and be less affected by the heating element 69. In order to obtain this improved thermal relationship between the heaters 69 and 73 as well as the thermostat assembly 81, it was necessary to make the well 22 of greater diameter than would be desirable from the standpoint of making any easy seal between the well 22 and the vessel 13. It should be evident that as the diameter of the hold 68 in the vessel 13 is increased, the difficulty in making an effective seal is also increased. The gasket 67, however, provides an easily engaged and very effective seal between the pump well 22 and the vessel 13.

The gasket 67 is an annular member which is received in the channel formed in wall 63 between the flange 65 and the shoulder 66. In section, as shown in FIG. 9, the gasket 67 may be considered as having a central body portion 101, an upper lip 102, and a sidewardly extending skirt 103 which skirt is positioned adjacent a recessed or undercut portion 104. The lip 102 is angled inwardly so as to blend with and seal against the outer surface of the pump well 22. The rounded edge of the lip 102 facilitates assembling the vessel 13 since it acts to more or less target the opening 68 of vessel 13 onto the gasket 67. Extending downwardly from lip 102, the body portion 101 is tapered outwardly slightly so that as the vessel 13 is urged downwardly on the gasket 67, there is an increasing pressure or interference between the inside diameter of the hole 68 and the outer surface of the gasket 67. Toward the bottom of the gasket 67 there is an undercut or recessed portion 104 adjacent to which the skirt 103 extends outwardly. As the vessel 13 reaches its limit of movement downwardly and bottoms against the annular plate 59, the vessel portion defining the hole 68 slides below the thickest part of the body portion 101 into flexing engagement with the skirt 103 urging the skirt into the recessed portion 104. As a consequence of this action, the central body portion 101 tends to lock the vessel 13 downwardly in engagement with the plate 59 providing what might be characterized as a detent action to maintain the seal. In addition, the elongated sloping outer surface of the gasket 67 provides somewhat of a cork-type of action in which increased compression of the gasket is achieved because of the slight angle on the exterior surface of the gasket 67. Thus, the gasket 67 achieves a tight seal and at the same time, because of the undercut 104 and the fact that the opening 68 of the vessel 13 seals below the widest portion of the gasket 67, there is a tendency for the vessel 13 to be locked in sealed engagement with the gasket 67. Tests have indicated that the locking effect provided by the seal is substantial enough so that the vessel 13 will remain assembled to the base assembly 12 even when the vessel is tilted with a capacity amount of coffee in the vessel 13 and when the latch member 44 is in the disengaged position.

In spite of this tight seal and the locking effect provided by the gasket 67, it is relatively easy to disconnect the vessel 13 from the base assembly by merely lifting one edge upwardly so as to lift the bottom of the vessel 13 out of the undercut 104 and begin the peripheral disengagement of the vessel 13 from the gasket 67. The inward slope on the outer surface of the gasket 67 results in the vessel sliding upwardly easily once a portion of the bottom wall is moved out of the undercut area 104. Accordingly, in spite of the substantial diameter of the pump well 22, there is achieved a leak proof seal at the gasket 67 which is made easily upon assembly of the vessel 13 to the base assembly 12 and is easily broken upon disassembly of the vessel 13.

While there has been shown and described a particular embodiment of the prevent invention, it will be apparent to those skilled in the art that various changes and modifications may be made without departing from the invention in its broader aspects, and it is, therefore, contemplated in the appended claims to cover all such changes and modifications as fall within the true spirit and scope of the present invention.

What is claimed as new and desired to be secured by Letters Patent of the United States is:

1. A coffee percolator of the type having a base assembly on which a glass vessel is detachably mounted, the improvement comprising a heater assembly on said base assembly, said heater assembly having a pump well formed with an upwardly facing well portion with a first heating element mounted in good heat transfer relation with the underside of said well portion, a second heating element disposed within said pump well around said well portion above said first heating element, said glass vessel having a bottom opening which is sealed to the outer periphery of said pump well, said pump well extending into said vessel to provide good heat transfer between said first and second heating elements and the liquid within said vessel, a thermostat connected in circuit to control said first heating element in response to the temperature of liquid within said vessel, said thermostat being supported on a heat conducting bracket having its upper end mounted on said pump well at a point outwardly of said well portion and positioned within said vessel.

2. The coffee percolator of claim 1 wherein said pump well includes a wall portion spaced outwardly from said first heating element and positioned within said glass vessel in contact with the liquid contained therein, said thermostat bracket being mounted on said wall portion to respond accurately to the temperature of said liquid and positioned in spaced relation to said first heating element.

3. A coffee percolator of the type having a base assembly on which a glass vessel is detachably mounted, the improvement comprising a heater assembly on said base assembly, said heater assembly having a pump well formed with an upwardly facing well portion with a first heating element mounted in good heat transfer relation with the underside of said well portion, a second heating element disposed within said pump well around said well portion above said first heating element, said glass vessel having a bottom opening which is sealed to the outer periphery of said pump well, said pump well extending into said vessel to provide good heat transfer between said first and second heating elements and the liquid within said vessel, said pump well is formed with an annular top wall extending outwardly from said well portion and depending side walls forming an annular heater chamber within which said first and second heating elements are disposed, said first heating element being brazed to said well portion and said second heating element being assembled against said annular top wall to heat the liquid outside of said portion.

4. A coffee percolator of the type having a base assembly on which a glass vessel is detachably mounted, the improvement comprising a heater assembly on said base assembly, said heater assembly having a pump well formed with an upwardly facing well portion with a first heating element mounted in good heat transfer relation with the underside of said well portion, a second heating element disposed within said pump well around said well portion above said first heating element, said glass vessel having a bottom opening which is sealed to the outer periphery of said pump well, said pump well extending into said vessel to provide good heat transfer between said first and second heating elements and the liquid within said vessel, said pump well is formed with a top wall extending outwardly from said well portion and walls depending from said top wall to form a heater chamber which extends at least in part into said glass vessel, a thermostat for controlling said first heating element in response to said liquid temperature, and a bracket extending downwardly from said top wall to support said thermostat in good heat transfer relation with the liquid in said vessel.

5. A coffeemaker comprising a base assembly including first and second heating elements and a thermostatic control switch, a glass vessel which is detachably mounted on said base assembly with an enlarged opening in the bottom into which a portion of said base assembly extends, means sealing said portion of said base assembly to said glass vessel to form an open topped container for brewing coffee, said base assembly including a heater assembly having a pump well which is secured to an annular plate, said plate supporting said vessel with said pump well extending upwardly into said vessel, said well being a formed sheet metal member having a centrally disposed well portion and defining a heater chamber surrounding said well portion, said first heating element being in good heat transfer relation to said well portion and said second heating element being in said heater chamber spaced from said well portion and in good heat transfer relation with said portion extending into said vessel.

6. The coffeemaker of claim 5 wherein said sealing means comprises an annular gasket received in a peripherally extending channel on said pump well, said gasket having a gradually outwardly sloping surface extending from the top thereof adjacent said pump well toward said annular plate, a continuous recess behind a skirt portion extending around the lower edge of said gasket, the portion of said vessel defining said opening compressing said gasket as it moves downwardly on said sloping surface into a seated position compressing said skirt into said recess.

7. The coffeemaker of claim 5 wherein said base assembly includes a cup-shaped plastic base supporting a handle and electric terminals thereon, an assembly stud secured to said well portion and extending through said base, retaining means on said stud below said base to clamp said heater assembly to said base, rigid conductors connecting said terminals to said heating elements.

8. The coffeemaker of claim 5 wherein said base assembly includes a cup-shaped base having upwardly extending side walls terminating in a shouldered lip, said annular plate having a downturned flange received over said lip, assembly means secured to said well portion and extending through said base to clamp said base and heater assembly together.

9. A heater assembly for an electric glass vessel percolator comprising a pump well formed of sheet metal adapted for insertion into the bottom of a glass coffee making vessel, said pump well including a well portion having an upwardly facing recess, a sheathed electrical heating element formed in a plurality of loops brazed to the outer surface of said well portion, an annular top wall on said pump well extending outwardly from said well portion, depending peripheral side walls on said top wall forming an annular heater chamber, a flexible heating element encircling said well portion and lying against the underside of said annular top wall, a thermostatic switch connected in circuit with said sheathed heating element, and a bracket mounted on said annular top wall extending downwardly from the underside thereof and supporting said switch to respond to the temperature of liquid contained within said vessel.

10. The heater assembly of claim 9 including a cover plate secured to the bottom of said pump well to close said annular heater chamber, said plate being secured to said well portion at its center, integrally formed legs extending upwardly from said plate into said chamber to urge said flexible heater against the bottom of said annular wall.

11. The heater assembly of claim 10 including a supporting annular plate having an inner rim clamped between said pump well depending side walls and said cover plate, said annular plate supporting said vessel thereon, sealing means received in a peripheral channel in said side walls to seal said vessel to said pump well.

12. The heater assembly of claim 10 wherein said heater chamber is provided with an inwardly facing annular recess adjacent said top wall, a C-shaped resilient ring having its outer edge received within said annular recess and engaging said flexible heater to retain it within said heater chamber, said legs on said cover plate engaging said ring and retaining said ring in clamping engagement with said flexible heater.

* * * * *